S. CHAPMAN.
Horse Hay-Fork.

No. 198,762.  Patented Jan. 1, 1878.

Witnesses  
John Wood  
A. Jones

Inventor:  
Stephen Chapman

UNITED STATES PATENT OFFICE.

STEPHEN CHAPMAN, OF CLOCKVILLE, NEW YORK.

IMPROVEMENT IN HORSE HAY-FORKS.

Specification forming part of Letters Patent No. 198,762, dated January 1, 1878; application filed August 6, 1877.

*To all whom it may concern:*

Be it known that I, STEPHEN CHAPMAN, of Clockville, Madison county, New York, have invented certain Improvements in Hay-Forks, of which the following is a specification:

My improvements relate to the construction and operation of forks for elevating hay and the like; and consist in the construction of the tines, and in bracing, suspending, and holding them, by which I attain great simplicity and strength, as well as cheapness in the manufacture.

The construction is as follows, referring to the accompanying drawing, in which—

Figure 1:
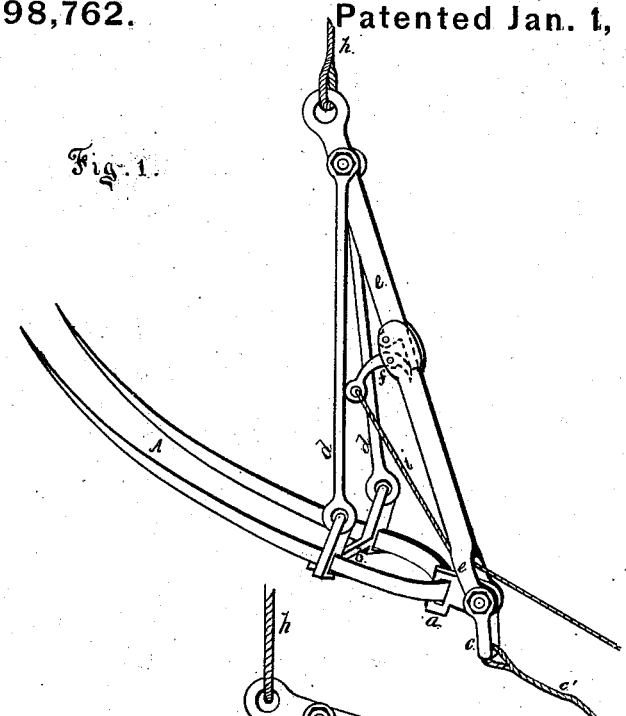
Figure 2:
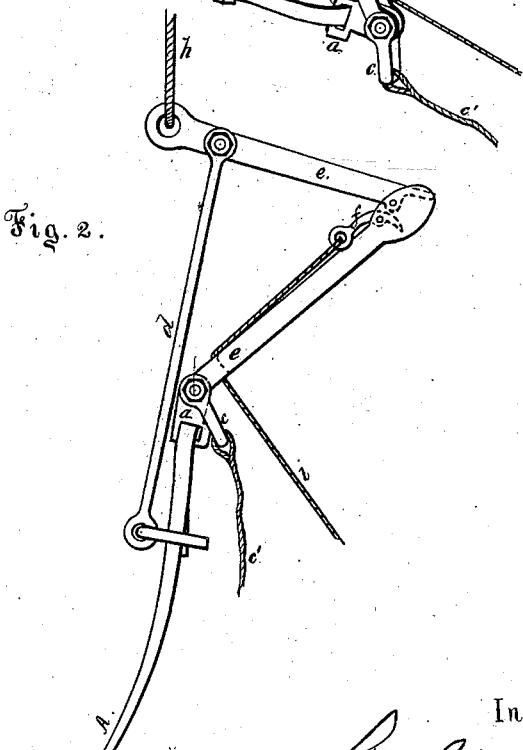

Figure 1 is the fork complete, ready to receive its load; and Fig. 2, the same tripped to discharge its load.

Like parts in the different figures are designated by the same letters.

A is the tines of the fork, made in one piece, of U form, properly pointed, and curved upward at the point, as clearly seen in the drawing.

At the center of the semicircular shank I attach a lug, $a$, by means of a collar that surrounds and closely fits the shank, the opening therein being of the form of the cross-section of the shank, with a small space below, to drive in a wedge or key, by which said collar is permanently attached. The lug has a hole through it, through which a screw-bolt passes, that unites a jointed brace, $e$, thereto, and a loop or clevis, $c$, to which a guide-rope, $c'$, is attached.

At the base of the tines there is a cross-bar, $b$, affixed, extending from one to the other, and having loops or eyes at each end, through which the tines pass, similar to the collar above named, and, like it, keyed to their places. This bar acts as a brace to hold and strengthen the tines at that point.

On the upper side of each of the eyes there is a ring forming one-half of the joint connecting the lower ends of two connecting-rods $d$ to said bar $b$. The other ends of rods $d$ are jointed to the brace $e$ near the top by a screw-bolt that passes through all three. The upper end of brace $e$ is formed into a ring, by which the fork, when in use, is suspended by means of a rope, $h$, attached thereto. The lower end of the brace $e$ is bifurcated, to embrace the lug $a$ before named, with which it is jointed.

At or near the center of the brace $e$ there is a rule-joint, having its pivoting-point a little below a straight line drawn from its upper to its lower end pivots, so that when the brace $e$ is straightened it will be held, like the stretchers of a carriage-top, in place.

The knuckle that holds the brace, when straight, rests on a cam or dog, $f$. (Shown by dotted lines in Fig. 1.) This cam has a short arm extending down from it with an eye in the end, to which a cord, $i$, is attached, which passes back through an opening made for that purpose by the bifurcated lower end of the brace $e$.

The sides of the rule-joint are expanded, so as to cover it and prevent injury by being caught therein.

When the fork is in the position shown in Fig. 1, it is ready for loading, and is guided by the cord $c'$ while being raised by cord $h$; and when the load is to be discharged the cord $i$ is drawn, which doubles up the brace $e$, permitting the points of the tines A to fall down parallel with connecting-rods $d$.

In the above-described fork, I claim—

The combination of the tines A, formed in one piece whole with the cross-bar $b$, having eyes for the reception of the tines, and the lug $a$, also having an eye and suitable devices for holding said cross-bar and lug in place upon the tine, whereby the parts of the fork may readily be separated or put together.

STEPHEN CHAPMAN.

Witnesses:
JOHN H. CHRISTMAN,
J. PAGE MUNRO.